June 29, 1954   A. J. MATTER   2,682,131
AUTOMATIC TABLE LEG ADJUSTER
Filed Sept. 13, 1952

INVENTOR.
Albert J. Matter

UNITED STATES PATENT OFFICE 2,682,131

AUTOMATIC TABLE LEG ADJUSTER

Albert J. Matter, Park Ridge, Ill.

Application September 13, 1952, Serial No. 309,449

20 Claims. (Cl. 45—139)

This invention relates to devices adapted to be attached to a table leg or other member to be supported, in the space ordinarily occupied by a conventional glider, to compensate for unevenness of floors on which such members stand.

Objects of the invention are simplicity of structure, ease of attachment, and automatic adjustment to level a table or other member that is being supported.

In carrying out my invention I employ a base to be attached to a member to be supported, a shoe adapted to rest on the floor and be relatively movable through limited distances in the vertical direction and angularly of a vertical axis; the base being provided with inclined, curved surfaces that rest on complementary surfaces on the shoe; and there being a spring tending constantly to hold the base and shoe at one limit of their composite relative movements. Such relative movements are resisted by friction between the meeting, inclined surfaces.

I have found that when the inclination of said inclined surfaces is uniform the resistance to relative rotation is variable. A further object of the present invention is to make such resistance more even.

This desired result is achieved by making the incline somewhat steeper at one end than at the other.

The present application is a continuation in part of my prior application, Ser. No. 285,507, dated May 1, 1952.

I attain these objects by means of the device shown in the accompanying drawing in which.

The illustrations are approximately twice actual size. Like numerals of reference indicate similar parts in the several views.

Figure 5:
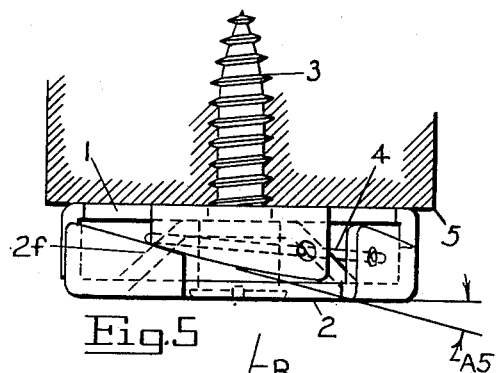
Fig. 5 shows an elevation of the assembly when compressed.
Figure 6:
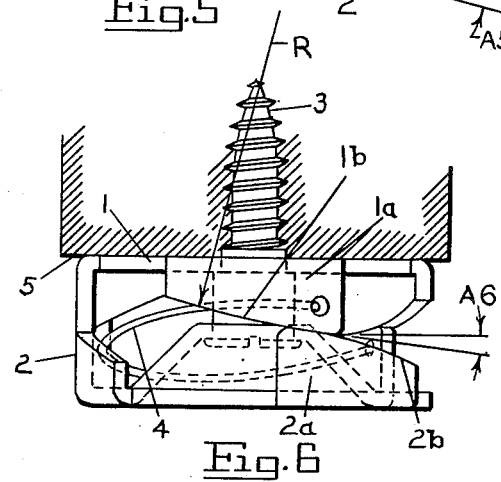
Fig. 6 shows the assembly extended.

A circular base member 1 is provided with 3 circumferential co-axially disposed bearing walls having curved angular surfaces 1b with a radius R, varying in tangential angularity from about 8 degrees at A6, Fig. 6, to about 14° at A5, Fig. 5. A central orifice 1e is provided for the reception of an attaching screw. A spring orifice is provided at 1d.

A shoe member 2 is similarly formed with 3 circumferential co-axially disposed bearing walls 2a having curved angular bearing surfaces 2b, similar in form to 1b and adapted to engage said bearing surfaces 1b as shown in Figs. 5 and 6. The center of the circular portion is conically indented at 2f and perforated at 2e to receive the enlarged body portion 3a of a screw 3 which has a head 3b and screw driver slot 3c, at 2d is provided an orifice for a spring end.

Figure 1:
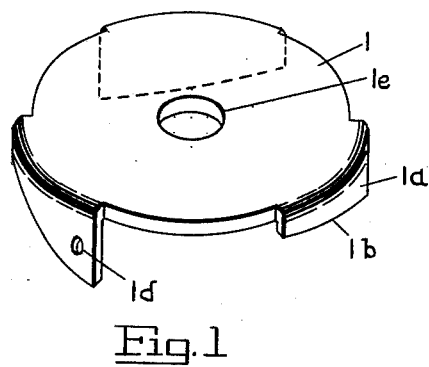
Fig. 1 is a perspective view of the base member.
Figure 4:
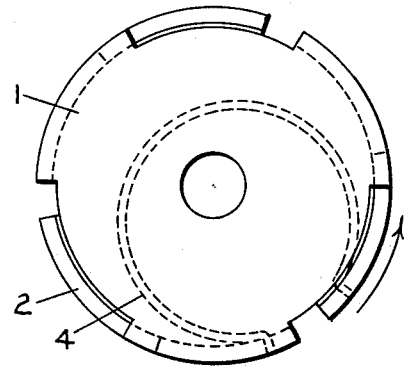
Fig. 4 is a plan view of the assembled device.
Figure 2:
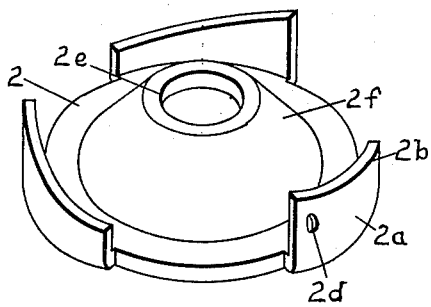
Fig. 2 shows the shoe member in perspective.
Figure 3:
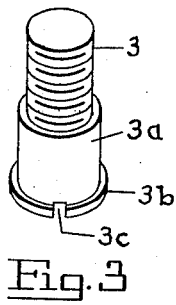
Fig. 3 illustrates the shouldered screw, which may be either wood screw or machine screw.

A spring 4 is semi-circular in form with ends bent outwardly to fit into orifices 1d and 2d for the purpose of urging rotation of shoe 2 in the direction of the arrow shown in Fig. 4, the base 1 being rigidly secured to a table base or leg indicated at 5 in Figs. 5 and 6 by screw shoulder 3a of screw 3. The screw may be machine screw threaded as shown in Fig. 3 or wood screw threaded as shown in Figs. 5 and 6 to suit either metal table bases or wood bases.

In the assembly shown in Figs. 5 and 6 it will be noted that spring urged rotation of the shoe 2 is limited by the screw head 3c engaging the under surface of the conical depression as shown in Fig. 6.

Downward pressure upon the table or upward pressure against the shoe 2 tends to cause the spring to compress and force the shoe rotarily along the inclined planes of surfaces 1b and 2b so as to compress the device into the position shown in Fig. 5. However, when the angle of the inclined surfaces is small, as shown, the turning components of such pressures or forces is not sufficient to overcome the frictional resistance to relative rotary movements between such surfaces. The spring, of course, augments the effect of friction in resisting compression. Therefore the adjuster may not compress upon contacting the floor while attached to a table leg, no matter how heavy the pressure may be or whether or not there be appreciable friction between the adjuster and the floor. But, by sliding the table a little in any direction, the shoe member of the adjuster turns until the adjuster automatically compresses to a point where the table becomes solidly supported. Also, if the table be slid from one location to another, over an uneven floor, the adjuster will automatically contract and expand as may be necessary to maintain the solid report.

In short, the adjuster is entirely automatic after it has been applied and, yet, slides freely over a floor in the same way as does an ordinary glide device.

In use the device is attached in place of one of the usual gliders under a table base or leg so that when compressed as shown in Fig. 5 it extends downwardly slightly less than the gliders and when extended as shown in Fig. 6 it extends downwardly slightly below the gliders. This provides adjustment of one leg either up or down from the normal level of the gliders to accommodate any unevenness of the floor upon which the table rests and thus prevents wobbling of the table.

It has been found that by balancing the incline of surfaces 1b and 2b against a spring of the correct tension the weight of the table will compress the device whereas the out of balance weight of one corner of the table alone will be properly supported so as to prevent rocking under normal load.

It is obvious that the number of inclined surfaces 1b and 2b may be more or less than 3 which latter is however preferred as it provides 3-point support and is easily formed. The general construction shown may be modified to suit varying conditions without departing from the spirit of the invention.

Having described my invention, what I claim as new and desire to secure by Letters Patent is:

1. In a table leg adjuster having a stationary base member with circular peripheral inclined curved surfaces and a rotatable member with circular peripheral inclined curved surfaces, a semi-circular spring attached at one end to the said stationary base member and at the other end to the said rotatable member so as to urge rotation of said rotatable member, said inclined curved surfaces being of varying degrees of steepness to provide nearly uniform resistance to rotation as the spring compresses.

2. A table leg adjuster comprising a base member adapted to be fixed to a table base or leg, an underlying shoe member, means connecting the said members together so as to support the shoe member for limited angular movement about a central vertical axis accompanied by limited vertical movement relative to the base member, each of said members having thereon a plurality of surfaces facing and engaged with those on the other member and arranged in a circle about said axis, such surfaces on at least one of the members being inclined lengthwise with respect to a horizontal plane, and a spring arranged in the space surrounded by said surfaces and acting on said members so as yieldingly to hold them at one limit of their relative angular movement; and the inclination of said inclined surfaces varying in a manner to provide nearly uniform resistance to relative rotation between said members, in use, as the stressing of the spring varies according to the angular positions of said members relative to each other.

3. A table leg adjuster as set forth in claim 2, wherein the angle of the inclined surfaces is about 8° at one end and about 14° at the other end.

4. A table leg adjuster as set forth in claim 2, wherein the spring is C-shaped, surrounds partially the axis of the adjuster, is disposed in a plane approximately at right angles to such axis and has an end attached to each of two adjuster members.

5. A table leg adjuster comprising a base member adapted to be fixed to a table base or leg, an underlying shoe member, means connecting said members together so as to support the shoe member for limited angular movement about a central vertical axis accompanied by limited vertical movement relative to the base member, the shoe member having thereon a plurality of surfaces arranged in a circle about said axis and being inclined lengthwise relative to a horizontal plane, the base member having thereon elements that rest on said inclined surfaces, and a spring acting on said members and tending constantly yieldingly to hold them in such angular relation to each other that said elements are over the high ends of said surfaces; and the inclination of each of said surfaces being such that the turning component of axial pressure thrusting the members together is balanced by the frictional resistance to angular movement of said members relative to each other.

6. A table leg adjuster as set forth in claim 5, wherein the inclination of the inclined surfaces varies from about 8° at their high ends to about 14° at the low ends.

7. A table leg adjuster comprising a base member and an underlying shoe member, means to secure said members together to permit limited relative angular and vertical movement between them, while holding the base member in fixed relation to a table base or leg, the base member having on the under side a plurality of surfaces arranged in a circle about the axis of the device, elements on the shoe member on which said surfaces rest, said surfaces being inclined to lie at an angle of about 8° to the horizontal at one end and at an angle of about 14° at the other end, and a spring acting on said members and tending constantly to keep the low ends of said surfaces over the supporting elements on the shoe member.

8. A table leg adjuster unit comprising a base member adapted to be fixed to a table base or leg, an underlying shoe member, means connecting said members together so as to support the shoe member for limited angular movement about a central axis accompanied by limited vertical movement relative to the base member, each of said members having thereon a plurality of surfaces arranged in a circle about said axis and facing and engaged with the surfaces on the other member, such surfaces being inclined lengthwise with respect to a horizontal plane and those on one member being complementary to those on the other member, the inclinations being at angles so acute that that friction between contacting surfaces is sufficient to prevent relative rotary movements between said members by reason of mere axial pressures tending to force the latter together, and a spring acting on said members so as yieldingly to hold them at that limit of their relative angular movement in which the overall height of the unit is greatest.

9. A unit as set forth in claim 8 wherein the inclination at the low ends of the surfaces on the shoe member is about 14° while the inclination at the high ends is about 8°, in order to provide nearly uniform resistance, during use, to relative rotation between said shoe member and the base member regardless of the variations in the stressing of the spring.

10. In a table leg adjuster a relatively flat base-member having a plurality of cylindrical inclined surfaces surrounding a central orifice, a screw having an enlarged shank and a head and disposed in said central orifice for the purpose of attaching said base-member rigidly to the bottom of a table base or leg, a shoe-member having a flat floor engaging face and a plurality of cylindrical inclined surfaces engaged with the aforesaid inclined cylindrical surfaces and having a central orifice through which said screw shank extends and in which it is rotatable, and limited in its outward movement by said screw head, and spring means urging rotation of said shoe member outwardly along said inclined surfaces for the purpose described.

11. A table leg adjuster comprising a circular base-member perforated at the center and having a plurality of peripheral inclined bearing surfaces, a shouldered screw having an enlarged shank and a head and adapted to enter the base perforation up to the shoulder of the enlarged shank for the purpose of attaching said base member to the under side of a table base or leg, a circular shoe member having a floor engaging surface and a centrally perforated recess adapted to rotatably engage said screw shank and limited in its outward movement by said screw head within said recess and having raised peripheral bearing surfaces opposite said floor engaging surface adapted to engage said base inclined surfaces and spring means for urging outward rotation of said shoe-member along said inclined surfaces of said base-member.

12. A table leg adjuster comprising a circular base-member perforated at the center and having raised peripheral surfaces, a shouldered screw having an enlarged shank and a head and adapted to enter the base perforation up to the shoulder of the enlarged shank for the purpose of attaching said base-member to the under side of a table base or leg, a circular shoe-member having a floor engaging surface and a centrally perforated recess adapted to rotatably engage said screw shank and limited in its outward movement by said screw head within said recess and having a plurality of peripheral inclined surfaces opposite said floor engaging surface adapted to engage said raised peripheral base surfaces, and spring means for urging outward rotation of said shoe-member along said inclined surfaces thereof: the inclination of said peripheral surfaces being not more than about 14°.

13. A table leg adjuster comprising a circular base-member perforated at the center and having a plurality of peripheral inclined surfaces, a shouldered screw having an enlarged shank and a head and adapted to enter the base perforation up to the shoulder of the enlarged shank for the purpose of rigidly securing said base-member to the under side of a table base or leg, a circular shoe member having a floor engaging surface surrounding a centrally raised portion that contains a recess in the under side, said raised portion containing a central hole through which said screw shank loosely extends and is limited in its outward movement by said screw head within said recess, the shoe member having a plurality of peripheral inclined surfaces opposite said floor engaging surface adapted to engage said inclined surfaces of the aforesaid base, and spring means within the adjuster for urging outward rotation of said shoe-member along said inclined surfaces.

14. An adjuster for the leg of a table or the like, consisting of a base adapted to bear against and be attached rigidly to the under side of each such leg, a rotatable shoe underlying said base and adapted to rest slidably on the floor, the base and the shoe having thereon cooperating narrow inclined surfaces circularly curved around a vertical axis and provided with edge faces inclined in the vertical direction and engaged with each other, a fastening device passing through the shoe and the base at said axis and adapted to be fixed to said leg, said shoe having a wide, deep, central recess in the under side, said fastening device being shaped to clamp the base rigidly to the bottom of the leg and allow the shoe to move along and around said axis, a head on the lower end of the fastening device positioned in said recess and serving as a stop to limit the downward movement of the shoe; and a spring extending through the space surrounded by the inclined surfaces and connected at its ends to the base and to the shoe, respectively, so as to tend at all times to turn the shoe in the direction to keep it in its lowermost position.

15. An adjuster as set forth in claim 14, wherein the inclination of the inclined surfaces is not more than 14°.

16. An adjuster for the leg of a table or the like consisting of a circular shoe adapted to rest slidably on a floor or other supporting surface, a circular base overlying the shoe, the base and the shoe having at their peripheries aligned walls engaged edge to edge, the meeting edges of said walls being inclined surfaces shaped to cause the vertical thickness of the adjuster to vary according to the relative angular positions of the shoe and base, a central fastening device passing through the shoe and the base, said device being shaped to clamp the base rigidly against the bottom of a leg to allow the shoe to move up and down and to rotate, the shoe containing in the under side a large, deep recess, centrally located, a head on the lower end of the fastening device positioned at all times wholly within said recess and serving as a stop to limit the downward movement of the shoe; and a spring in the space surrounded by said walls with its ends connected to the shoe and the base, respectively, and tending at all times to turn the shoe in the direction to keep it in its lowermost position.

17. An adjuster as set forth in claim 16, wherein the inclined surfaces are inclined at an angle to the horizontal not substantially greater than about 14°.

18. An adjuster as set forth in claim 16, wherein the fastening device is screwthreaded at the end opposite that at which the head is located and has thereon, at the base of the screw threads, a shoulder that engages the base member of the adjuster.

19. An adjuster for the leg of a table or the like consisting of a shoe adapted to rest slidably on a floor or other supporting surface, a base overlying the shoe, the shoe and the base being circular metal stampings having along their peripheries aligned walls engaged edge to edge, the meeting edges of said walls being inclined surfaces shaped to cause the vertical thickness of the adjuster to vary according to the relative angular positions of the base and shoe, a fastening device passing through the shoe and base at the axis of the assembly, such device having an end adapted to enter said leg and a shoulder to engage the base and clamp it tightly against the leg, the shoe containing in the under side a large, deep, central recess, said fastening device having at its lower end a head which at all times lies within the recess, while allowing the shoe to move up and down a distance equal to the depth of the recess less the thickness of the head, and a spring housed in the space within the adjuster and connected to both the shoe and base and exerting a constant effort to turn the shoe in the direction to give the adjuster its greatest thickness.

20. An adjuster as set forth in claim 19, wherein the angle of the inclined surfaces to the horizontal does not substantially exceed 14°.

References Cited in the file of this patent

UNITED STATES PATENTS

| Number | Name | Date |
|---|---|---|
| 133,766 | Easterly | Dec. 10, 1872 |
| 1,865,899 | Gohmann | July 5, 1932 |
| 1,973,948 | Fogelstrom | Sept. 18, 1934 |
| 2,380,030 | Deal | July 10, 1945 |